United States Patent
Yu

(10) Patent No.: US 11,551,392 B2
(45) Date of Patent: Jan. 10, 2023

(54) GRAPHIC DRAWING METHOD AND APPARATUS, DEVICE, AND STORAGE MEDIUM

(71) Applicant: ZHEJIANG UNIVIEW TECHNOLOGIES CO., LTD., Zhejiang (CN)

(72) Inventor: Guosheng Yu, Zhejiang (CN)

(73) Assignee: ZHEJIANG UNIVIEW TECHNOLOGIES CO., LTD., Zhejiang (CN)

(*) Notice: Subject to any disclaimer, the term of this patent is extended or adjusted under 35 U.S.C. 154(b) by 0 days.

(21) Appl. No.: 17/265,801

(22) PCT Filed: Feb. 25, 2019

(86) PCT No.: PCT/CN2019/076000
§ 371 (c)(1),
(2) Date: Feb. 3, 2021

(87) PCT Pub. No.: WO2020/024580
PCT Pub. Date: Feb. 6, 2020

(65) Prior Publication Data
US 2021/0166457 A1 Jun. 3, 2021

(30) Foreign Application Priority Data
Aug. 3, 2018 (CN) .................. 201810876250.X

(51) Int. Cl.
*G06T 11/60* (2006.01)
*G06T 11/00* (2006.01)
*G06T 11/20* (2006.01)

(52) U.S. Cl.
CPC ............ *G06T 11/60* (2013.01); *G06T 11/001* (2013.01); *G06T 11/203* (2013.01); *G06T 2200/24* (2013.01)

(58) Field of Classification Search
CPC ...... G06T 11/60; G06T 11/001; G06T 11/203; G06T 2200/24; G06F 9/451
See application file for complete search history.

(56) References Cited

U.S. PATENT DOCUMENTS

| 2010/0281373 A1 | 11/2010 | Pueyo et al. |
| 2011/0161912 A1 | 6/2011 | Eteminan et al. |

(Continued)

FOREIGN PATENT DOCUMENTS

| CN | 103974209 A | 8/2014 |
| CN | 104883515 A | 9/2015 |

(Continued)

OTHER PUBLICATIONS

China National Intellectual Property Administration, International Search Report issued in International application No. PCT/CN2019/076000; dated May 10, 2019, 4 pages.

(Continued)

*Primary Examiner* — Jennifer Mehmood
*Assistant Examiner* — Andrew Shin
(74) *Attorney, Agent, or Firm* — Hunton Andrews Kurth LLP

(57) ABSTRACT

Provided are a graphic drawing method applied to a terminal device. The terminal device includes a canvas deployed on an upper layer of a video stream display window and structured feature data of at least one basic graphic matching the canvas. The method includes: monitoring in real time a target graphic drawing event that is performed by a paintbrush based on a selected basic graphic; upon monitoring the target graphic drawing event, acquiring, for each time point in which each frame of image in a video stream is displayed, a drawing coordinate of the paintbrush at each time point; and rendering and drawing on the canvas a target graphic corresponding to an image displayed at each time point (Continued)

according to structured feature data of the selected basic graphic and the drawing coordinate. Further provided are a graphic drawing apparatus, a device, and a storage medium.

16 Claims, 5 Drawing Sheets

(56) References Cited

U.S. PATENT DOCUMENTS

| | | | |
|---|---|---|---|
| 2012/0062591 A1* | 3/2012 | Omura | G06F 3/0416 |
| | | | 345/173 |
| 2016/0232144 A1 | 8/2016 | Zhou | |
| 2018/0167427 A1* | 6/2018 | Kedenburg, III | H04L 65/4076 |
| 2020/0252553 A1* | 8/2020 | Luo | G06F 3/0488 |

FOREIGN PATENT DOCUMENTS

| | | | |
|---|---|---|---|
| CN | 105635519 A | 6/2016 | |
| CN | 106385591 A | 2/2017 | |
| CN | 107835464 A | 3/2018 | |
| CN | 107888845 A | 4/2018 | |

OTHER PUBLICATIONS

The State Intellectual Property Office of People's Republic of China, First Office Action issued in CN Application No. 201810876250.X; dated Sep. 14, 2020, 11 pages.

Extended European Search Report, from the European Patent Office, issued to EP Application No. 19843865.7 dated Mar. 29, 2022, 12 pages.

* cited by examiner

GRAPHIC DRAWING METHOD AND APPARATUS, DEVICE, AND STORAGE MEDIUM

CROSS-REFERENCE TO RELATED APPLICATIONS

This is a National Stage Application filed under 35 U.S.C. § 371 based on International Patent Application No. PCT/CN2019/076000, filed on Feb. 25, 2019, which claims priority to Chinese Patent Application No. 201810876250.X filed on Aug. 3, 2018, the disclosures of both of which are incorporated herein by reference in their entireties.

TECHNICAL FIELD

The present disclosure relates to the field of browser graphic drawing technologies, for example, to a graphic drawing method and apparatus, a device, and a storage medium.

BACKGROUND

A video surveillance product is usually equipped with a terminal device which is based on a browser/server (B/S) structure and can be used to watch live video and draw some graphics (including geometric and text graphics) on live video, so that the user, through such a terminal device, implements service functions such as marking and annotation by drawing graphics. However, with the continuous development of browser technology, the plug-in technology that used to be capable of being applied in the browser for implementing the graphic drawing function is no longer applicable to new versions of browsers developed based on the next generation of HyperText Markup Language 5 (HTML5). Moreover, new versions of browsers developed based on HTML5 can only implement complex graphics drawing at the image display level through the graphic drawing function implemented by means of videos and canvas tags, but cannot perform graphic drawing on the live video while playing the live video, and in addition, the amount of data processing corresponding to the graphics drawing is large, and the data processing efficiency is low. As a result, interactive processing such as selection cannot be performed for the drawn graphics.

SUMMARY

The present disclosure provides a graphic drawing method and apparatus, a device, and a storage medium, which have a small amount of data processing and a high data processing efficiency and can perform graphic drawing on a video played and displayed by a browser to implement the graphic drawing animation effect and ensure that the drawn graphics can be used for interactive processing.

In one embodiment, embodiments of the present disclosure provide a graphic drawing method which is applied to a terminal device that displays each frame of image of a video stream through a video stream display window on a browser page. The terminal device includes a canvas deployed on the upper layer of the video stream display window and structured feature data of at least one basic graphic matching the canvas. The method includes the steps described below.

A target graphic drawing event that is performed by a paintbrush based on a selected basic graphic is monitored in real time.

In a case where the target graphic drawing event is monitored, for a time point in which each frame of image in the video stream is displayed, a drawing coordinate of the paintbrush at each time point is acquired.

A target graphic corresponding to an image displayed by the video stream at each time point is rendered and drawn on the canvas according to structured feature data of the selected basic graphic and the drawing coordinate.

In one embodiment, the embodiments of the present disclosure provide a graphic drawing apparatus which is applied to a terminal device that displays each frame of image of a video stream through a video stream display window on a browser page. The terminal device includes a canvas deployed on the upper layer of the video stream display window and structured feature data of at least one basic graphic matching the canvas. The apparatus includes an event monitoring module, a coordinate acquisition module, and a graphic drawing module.

The event monitoring module is configured to monitor in real time a target graphic drawing event that is performed by a paintbrush based on a selected basic graphic.

The coordinate acquisition module is configured to, in a case where the target graphic drawing event is monitored, acquire, for a time point in which each frame of image in the video stream is displayed, a drawing coordinate of the paintbrush at each time point.

The graphic drawing module is configured to render and draw on the canvas a target graphic corresponding to an image displayed by the video stream at each time point according to structured feature data of the selected basic graphic and the drawing coordinate.

In one embodiment, the present disclosure further provides a device. The device includes a memory and a processor, where the memory is configured to store a computer program, and the processor is configured to execute the computer program to perform the method of any embodiment described above.

In one embodiment, the present disclosure further provides a storage medium storing a computer-readable program. When the computer-readable program is executed, the method of any embodiment described above is performed.

REFERENCE LIST

Figure 1:
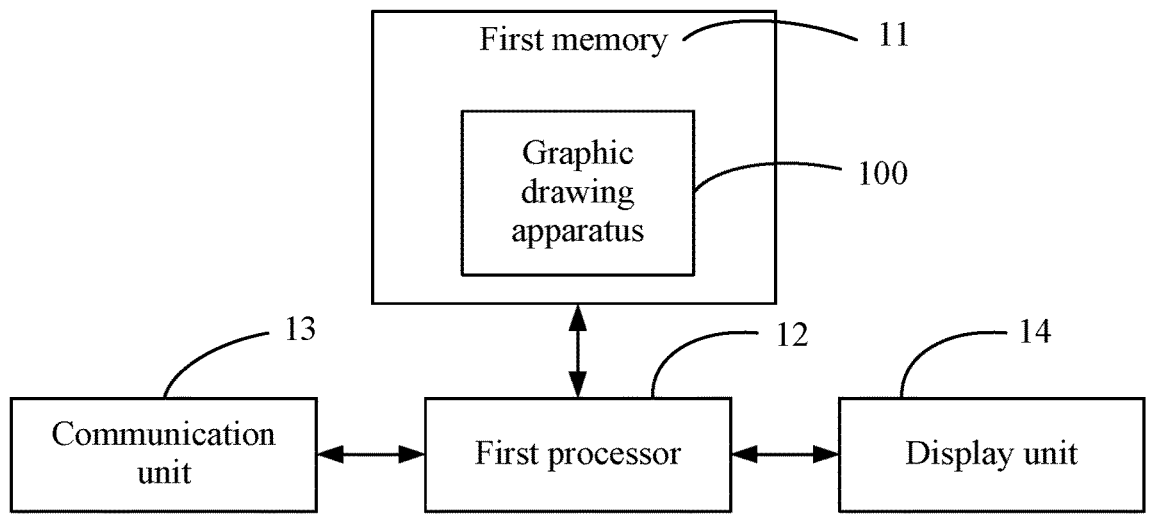
FIG. 1 is a schematic structural diagram of a terminal device according to an embodiment of the present disclosure.

10 terminal device
11 first memory
12 first processor
13 communication unit
14 display unit
100 graphic drawing apparatus
110 event monitoring module
120 coordinate acquisition module
130 graphic drawing module
111 sub-event monitoring sub-module
112 drawing determining sub-module
131 coordinate transformation sub-module
132 feature generation sub-module
133 rendering and drawing sub-module
140 parameter adjustment module
1110 second processor
1120 second memory

DETAILED DESCRIPTION

The embodiments described herein are part, not all, of embodiments of the present disclosure. Generally, the components of the embodiments of the present disclosure described and illustrated in the drawings herein may be arranged and designed through one or more configurations.

Similar reference numerals and letters indicate similar items in the following drawings, and therefore, once a particular item is defined in one drawing, the item needs no more definition and explanation in subsequent drawings.

Some embodiments of the present disclosure will be described hereinafter in conjunction with the drawings. If not in collision, the embodiments described herein and the features thereof may be combined with each other.

With reference to FIG. 1, FIG. 1 is a schematic structural diagram of a terminal device 10 according to an embodiment of the present disclosure. In this embodiment, the terminal device 10 is configured to display each frame of image in a video stream through a browser page to implement the playing and displaying of the video stream. The terminal device 10 is further configured to allow a user to draw graphics on the video stream while playing and displaying the video stream and implement a graphic drawing animation effect. The terminal device 10 may be, but is not limited to, a smartphone, personal computer (PC), a tablet, a personal digital assistant (PDA), a mobile Internet device (MID), etc.

In this embodiment, the terminal device 10 includes a graphic drawing apparatus 100, a first memory 11, a first processor 12, a communication unit 13, and a display unit 14. The first memory 11, the first processor 12, the communication unit 13 and the display unit 14 are electrically connected to each other directly or indirectly to implement the transmission and interaction of data. For example, the electrical connections between these components may be implemented through one or more communication buses or signal lines. In one embodiment, the interaction may be understood as the interaction between the graphic and the user, for example, the user may zoom in, zoom out or drag the graphic as needed. The graphic drawing apparatus 100 includes at least one software function module capable of being stored in the first memory 11 in the form of software or firmware, and the first processor 12 performs one or more functional applications and data processing by executing the software function module corresponding to the graphic drawing apparatus 100 stored in the first memory 11.

In this embodiment, the display unit 14 includes a display, and the display unit 14 displays the browser page through the display so that each frame of image in the video stream is displayed in a video stream display window of the browser page. The terminal device 10 deploys a canvas covering the video stream display window on the upper layer of the video stream display window, and the terminal device 10 draws a corresponding target graphic for each frame of image in the video stream through the canvas and then displays the target graphic corresponding to each frame of image through the display unit 14 to implement the graphic drawing animation effect on the video stream while playing and displaying the video stream. The canvas is not on the same layer as the video stream display window such that drawing graphic on the canvas does not interfere with the playing and displaying of the video stream. In one implementation of this embodiment, since the human eye will not perceive the lag of the image at 25 frames per second, the display time interval between two adjacent frames in the video stream should be no more than 40 ms, and the terminal device 10 also needs to ensure that the time point and time interval of each graphic drawing for each frame of image match the playing and displaying status of the video stream, that is, each graphic drawing corresponds to one frame of image of the video stream.

In this embodiment, the first memory 11 may be configured to store structured feature data of at least one base graphic, where the basic graphic may be a geometric graphic or a textual graphic. When the basic graphic is a geometric graphic, the basic graphic may be, but is not limited to, a rectangle, a circle, a waist shape, a triangle, an ellipse, etc. The structured feature data of each basic graphic is used for indicating key features of that basic graphic. In one embodiment, the key features include attribution features and behavioral features. In one embodiment, the attribution features include an upper-left corner coordinate, a lower-right corner coordinate, a thickness and a color of the line, whether the center of the rectangle is filled, a fill color, transparency, etc., when the basic graphic is drawn on the corresponding canvas. In one embodiment, the behavioral features include whether the basic graphic is selected on the corresponding canvas, whether the basic graphic is displayed, etc. The structured feature data corresponding to different basic graphics differ from each other, and the structured feature data of the basic graphic matches the current canvas. If at least one of the location or size of the current canvas changes, the structured feature data of at least one basic graphic corresponding to the canvas is also adjusted to ensure that the structured feature data of at least one basic graphic always matches the canvas so that interactive processing can be performed on the target graphic drawn on the canvas based on the structured feature data of the basic graphic. Since the drawing of the target graphic is implemented based on the structured feature data of the basic graphic, the computing resources of the terminal device 10 do not need to be consumed substantially to construct and draw the target graphic, thereby reducing the amount of data processing in the graphic drawing process and accordingly improving the data processing efficiency.

In this embodiment, the first memory 11 may be, but is not limited to, a random access memory (RAM), a read only memory (ROM), a programmable read-only memory (PROM), an erasable programmable read-only memory (EPROM), an electric erasable programmable read-only memory (EEPROM), etc. The first memory 11 may be configured to store a program, and the first processor 12 executes the program after receiving an execution instruction.

In this embodiment, the first processor 12 may be an integrated circuit chip having a signal processing capability. The first processor 12 may be a general-purpose processor, including a central processing unit (CPU), a network processor (NP), etc. The first processor 12 may implement or execute one or more methods, steps, and logic block diagrams disclosed in the embodiments of the present disclosure. The general-purpose processor may be a microprocessor or any conventional processor.

In this embodiment, the communication unit 13 is configured to establish a communication connection between the terminal device 10 and other electronic devices through a network and to acquire a video stream to be played and displayed from the other electronic devices through the network. The other electronic devices may be, but are not limited to, a video surveillance device, a server with video stream data stored, and other terminal devices with video stream data stored.

In this embodiment, the terminal device 10 performs graphic drawing on the video played and displayed by the browser through the graphic drawing apparatus 100 to implement the graphic drawing animation effect and ensure that the drawn graphics can be used for interactive processing.

In one embodiment, the structure shown in FIG. 1 is merely one structure of the terminal device 10, and the terminal device 10 may further include more or fewer components than the components shown in FIG. 1 or may have a configuration different from the configuration shown in FIG. 1. Various components shown in FIG. 1 may be implemented by hardware, software or a combination thereof.

Figure 2:
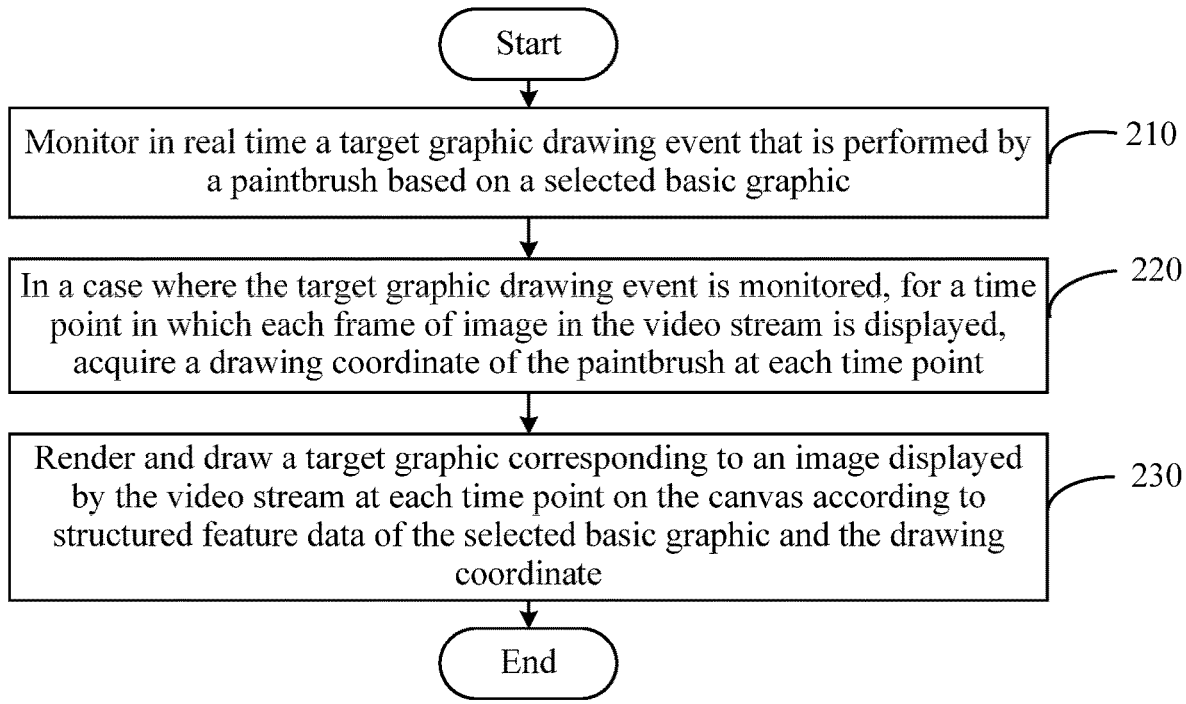
FIG. 2 is a schematic flowchart of the first graphic drawing method according to an embodiment of the present disclosure.

With reference to FIG. 2, FIG. 2 is a schematic flowchart of the first graphic drawing method according to an embodiment of the present disclosure. In the embodiments of the present disclosure, the graphic drawing method is applied to the preceding terminal device 10 that displays each frame of image of a video stream through a video stream display window on a browser page. The terminal device 10 is deployed with a canvas on the upper layer of the video stream display window and stores structured feature data of at least one basic graphic matching the canvas. In one embodiment, the graphic drawing method includes steps 210 to 230.

In step 210, a target graphic drawing event that is performed by a paintbrush based on a selected basic graphic is monitored in real time.

In one embodiment, whether the target graphic drawing event performed by the paintbrush based on the selected basic graphic is generated is monitored in real time. In this embodiment, the paintbrush is configured to draw graphics on the current corresponding canvas of the terminal device 10. The user, when drawing graphics using one basic graphic selected from the at least one basic graphic, may draw a corresponding target graphic on the canvas based on the selected basic graphic by means of controlling the event state of the paintbrush in the terminal device 10, where the event state of the paintbrush may be regulated by controlling the click and movement of the mouse or by controlling the click and movement of the touch screen. The terminal device 10, by monitoring in real time whether the target graphic drawing event performed by the paintbrush based on the selected basic graphic is generated, can intuitively know whether graphic drawing is performed on the canvas for the currently displayed video stream.

Figure 3:
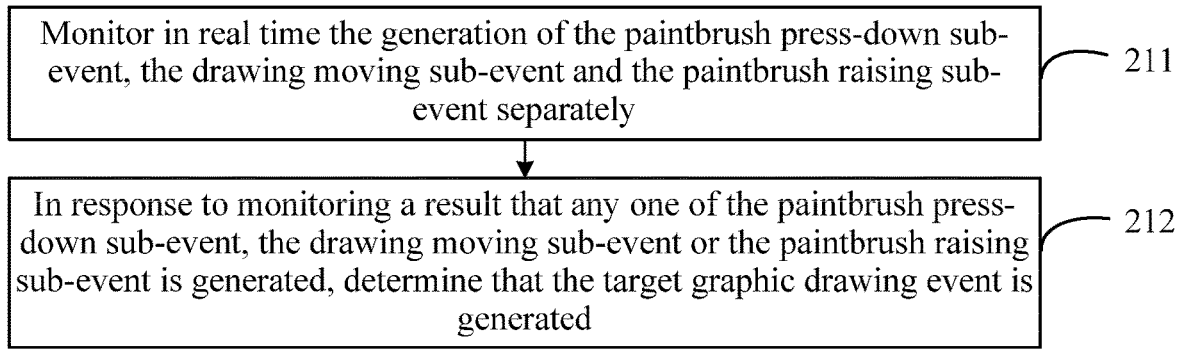
FIG. 3 is a schematic flowchart of the second graphic drawing method according to an embodiment of the present disclosure.

In one embodiment, with reference to FIG. 3, FIG. 3 is a schematic flowchart of the second graphic drawing method according to an embodiment of the present disclosure, and this figure is also a schematic flowchart of sub-steps included in step 210 in FIG. 2. In this embodiment, the event state of the paintbrush includes a paintbrush press-down state, a drawing moving state, and a paintbrush raising state. The paintbrush press-down state means that the paintbrush is in a state where the paintbrush is currently pressed down by the user and is ready to perform graphic drawing, the drawing moving state means that the paintbrush is in a state where the paintbrush has currently been pressed down by the user and moves under the control of the user to draw graphics, and the paintbrush raising state means that the paintbrush is currently in a state where graphic drawing is completed. The target graphic drawing event includes a paintbrush press-down sub-event, a drawing moving sub-event, and a paintbrush raising sub-event. The paintbrush press-down sub-event corresponds to the paintbrush press-down state, the drawing moving sub-event corresponds to the drawing moving state, and the paintbrush raising sub-event corresponds to the paintbrush raising state. Step 210 may include sub-steps 211 and 212.

In sub-step 211, the generation of the paintbrush press-down sub-event, the drawing moving sub-event and the paintbrush raising sub-event is separately monitored in real time.

In sub-step 212, in response to monitoring a result that any one of the paintbrush press-down sub-event, the drawing moving sub-event or the paintbrush raising sub-event is generated, it is determined that the target graphic drawing event is generated.

In this embodiment, when any one of the paintbrush press-down sub-event, the drawing moving sub-event or the paintbrush raising sub-event is monitored, it is indicated that the paintbrush is used by the user to perform graphic drawing, that is, the target graphic drawing event performed by the paintbrush based on the selected basic graphic is generated.

In step 220, in a case where the target graphic drawing event is monitored, for a time point in which each frame of image in the video stream is displayed, a drawing coordinate of the paintbrush at each time point is acquired.

In this embodiment, when the terminal device 10 monitors any one of the paintbrush press-down sub-event, the drawing moving sub-event or the paintbrush raising sub-event included in the target graphic drawing event, the terminal device 10 acquires the drawing coordinate of the paintbrush on the browser page at each image display time point according to the time point where each frame of image in the video stream is displayed, to draw a target graphic matching the currently displayed video stream image on the canvas based on each acquired drawing coordinate, where each frame of image corresponds to one target graphic.

Figure 4:
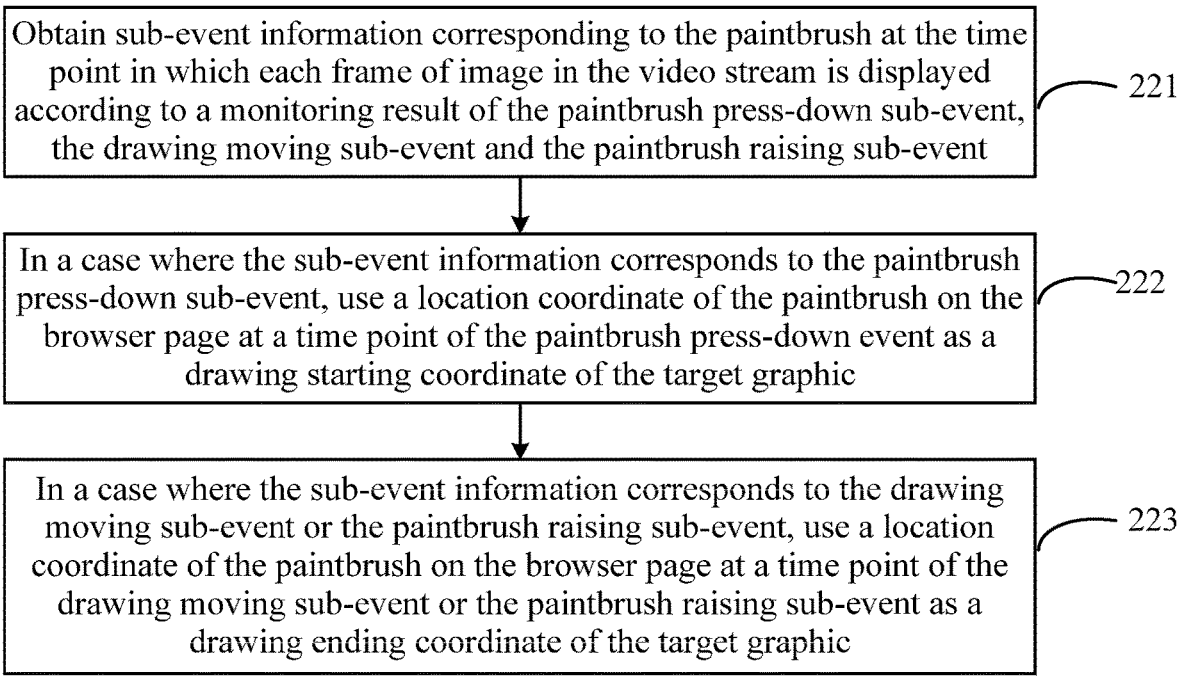
FIG. 4 is a schematic flowchart of the third graphic drawing method according to an embodiment of the present disclosure.

In one embodiment, with reference to FIG. 4, FIG. 4 is a schematic flowchart of the third graphic drawing method according to an embodiment of the present disclosure, and this figure is also a schematic flowchart of sub-steps included in step 220 in FIG. 2. In this embodiment, the drawing coordinate includes a drawing starting coordinate and a drawing ending coordinate. The drawing starting coordinate refers to the starting drawing location of a target graphic corresponding to the current target graphic drawing event, and the drawing ending coordinate refers to the drawing progress location of a target graphic corresponding to the current target graphic drawing event at the current time point during the drawing process. In step 220, the step in which for the time point in which each frame of image in the video stream is displayed, the drawing coordinate of the paintbrush at each time point is acquired includes sub-steps 221, 222, and 223.

In sub-step 221, sub-event information corresponding to the paintbrush at the time point in which each frame of image in the video stream is displayed is obtained according to a monitoring result of the paintbrush press-down sub-event, the drawing moving sub-event and the paintbrush raising sub-event.

In this embodiment, the terminal device 10, in a case where the target graphic drawing event is monitored, determines, at the time point in which each frame of image in the video stream is displayed according to the monitoring result, which of the paintbrush press-down sub-event, the drawing moving sub-event and the paintbrush raising sub-event the sub-event monitored at the current time point belongs to, to obtain the sub-event information corresponding to the paintbrush at the time point in which each frame of image in the video stream is displayed.

In sub-step 222, in a case where the sub-event information corresponds to the paintbrush press-down sub-event, a location coordinate of the paintbrush on the browser page at a time point of the paintbrush press-down event is used as a drawing starting coordinate of the target graphic.

In this embodiment, when the sub-event information obtained by the terminal device 10 corresponds to the paintbrush press-down sub-event, it means that the paintbrush has not been used under the control of the user to draw the target graphic at the current time point, and the location coordinate of the paintbrush on the browser page at the current time point is the drawing starting coordinate of the target graphic.

In sub-step 223, in a case where the sub-event information corresponds to the drawing moving sub-event or the paintbrush raising sub-event, a location coordinate of the paintbrush on the browser page at a time point of the drawing moving sub-event or the paintbrush raising sub-event is used as a drawing ending coordinate of the target graphic.

In this embodiment, when the sub-event information obtained by the terminal device 10 corresponds to the drawing moving sub-event or the paintbrush raising sub-event, it means that the paintbrush is in the graphic drawing stage or close to the graphic drawing stage at the current time point, and the location coordinate of the paintbrush on the browser page at the current time point is the drawing ending coordinate of the target graphic matching the displayed video stream image at the current time point.

In this embodiment, when the sub-event information obtained by the terminal device 10 corresponds to the paintbrush press-down sub-event, the drawing ending coordinate of the target graphic at the current time point is numerically the same as the drawing starting coordinate at this time to ensure the target graphic based on any basic graphic is a point at this time; and when the sub-event information obtained by the terminal device 10 corresponds to the drawing moving sub-event or the paintbrush raising sub-event, the drawing starting coordinate of the target graphic at the current time point is the same as the drawing starting coordinate of the target graphic when the sub-event information corresponds to the paintbrush press-down sub-event.

In step 230, a target graphic corresponding to an image displayed by the video stream at each time point is rendered and drawn on the canvas according to structured feature data of the selected basic graphic and the drawing coordinate.

In this embodiment, every time the terminal device 10 acquires the drawing coordinate of the paintbrush at the time point when the current image is displayed, the terminal device 10 obtains structured feature data of a target graphic that is supposed to be displayed on the canvas at the current time point according to the acquired drawing coordinate and the structured feature data of the selected basic graphic and renders and draws on the canvas a target graphic matching the video stream image played and displayed at the current time point based on the obtained structured feature data of the target graphic.

Figure 5:
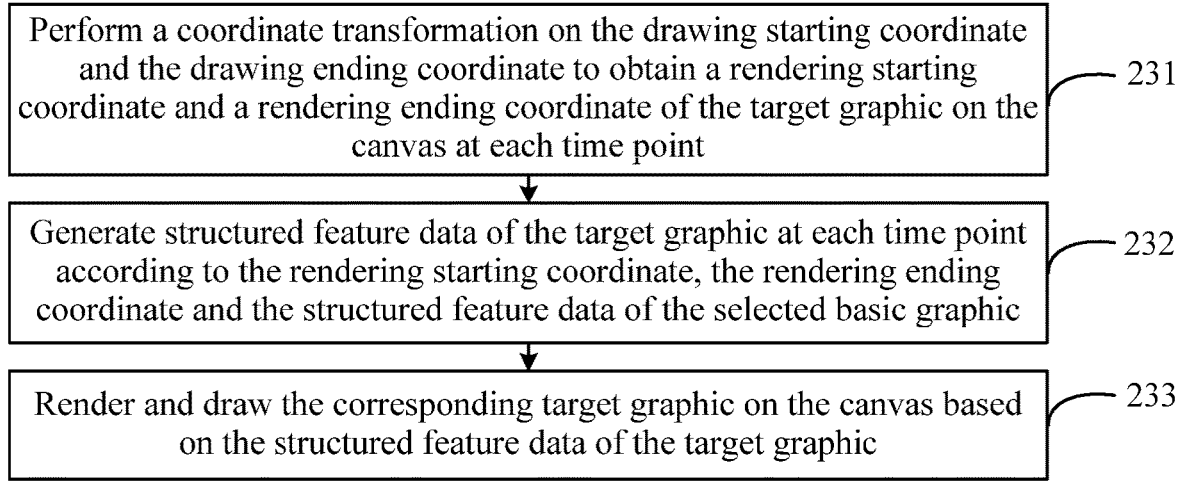
FIG. 5 is a schematic flowchart of the fourth graphic drawing method according to an embodiment of the present disclosure.

In one embodiment, with reference to FIG. 5, FIG. 5 is a schematic flowchart of the fourth graphic drawing method according to an embodiment of the present disclosure, and this figure is also a schematic flowchart of sub-steps included in step 230 in FIG. 2. In this embodiment, step 230 includes sub-steps 231, 232, and 233.

In sub-step 231, a coordinate transformation is performed on the drawing starting coordinate and the drawing ending coordinate to obtain a rendering starting coordinate and a rendering ending coordinate of the target graphic on the canvas at each time point.

In this embodiment, the drawing starting coordinate and the drawing ending coordinate are the corresponding drawing coordinate of the target graphic on the browser page at each time point, and the terminal device 10 performs the coordinate transformation on the drawing starting coordinate and the drawing ending coordinate to obtain the rendering starting coordinate and the rendering ending coordinate of the target graphic on the canvas during the display of rendering and drawing.

In sub-step 232, structured feature data of the target graphic at each time point is generated according to the rendering starting coordinate, the rendering ending coordinate and the structured feature data of the selected basic graphic.

In this embodiment, the terminal device 10 performs data adjustment on the structured feature data of the selected basic graphic according to the obtained rendering starting coordinate and rendering ending coordinate to generate the structured feature data indicating the target graphic at the current time point. For example, when the selected basic graphic is a rectangle and the structured feature data of the selected basic graphic includes the upper-left corner coordinate and the lower-right corner coordinate, i.e., (left, top) and (right, bottom), respectively, the terminal device 10 obtains structured feature data of a target graphic that is supposed to be rendered and drawn on the canvas at the current time point by replacing the rendering starting coordinate and the rendering ending coordinate with the upper-left corner coordinate (left, top) and the lower-right corner coordinate (right, bottom) while remaining other structured feature data of the selected basic graphic.

In sub-step 233, the corresponding target graphic is rendered and drawn on the canvas based on the structured feature data of the target graphic.

In this embodiment, since the structured feature data matches the canvas, every time the terminal device 10 obtains the structured feature data of the target graphic matching the video stream image displayed at the current time point, the terminal device 10 renders and draws the corresponding target graphic on the canvas that is not on the same layer as the video stream display window based on the structured feature data of the target graphic to implement the graphic drawing animation effect on the video stream while playing and displaying the video stream, thereby ensuring that the drawn graphics can be used for interactive processing. Since the drawing of the target graphic is implemented based on the structured feature data of the basic graphic, the computing resources of the terminal device 10 do not need to be consumed substantially to construct and draw the target graphic, thereby reducing the amount of data processing in the graphic drawing process and accordingly improving the data processing efficiency.

In the embodiments of the present disclosure, every time the terminal device 10 completes the rendering and drawing of the target graphic matching the video stream image displayed at the current time point on the canvas, the terminal device 10 stores the target graphic at each time point and then erased the target graphic or sets the target graphic to be in a non-display state so that the terminal device 10 can draw the corresponding matched target graphic on the canvas that is blank in appearance when the next frame of image is displayed.

Figure 6:
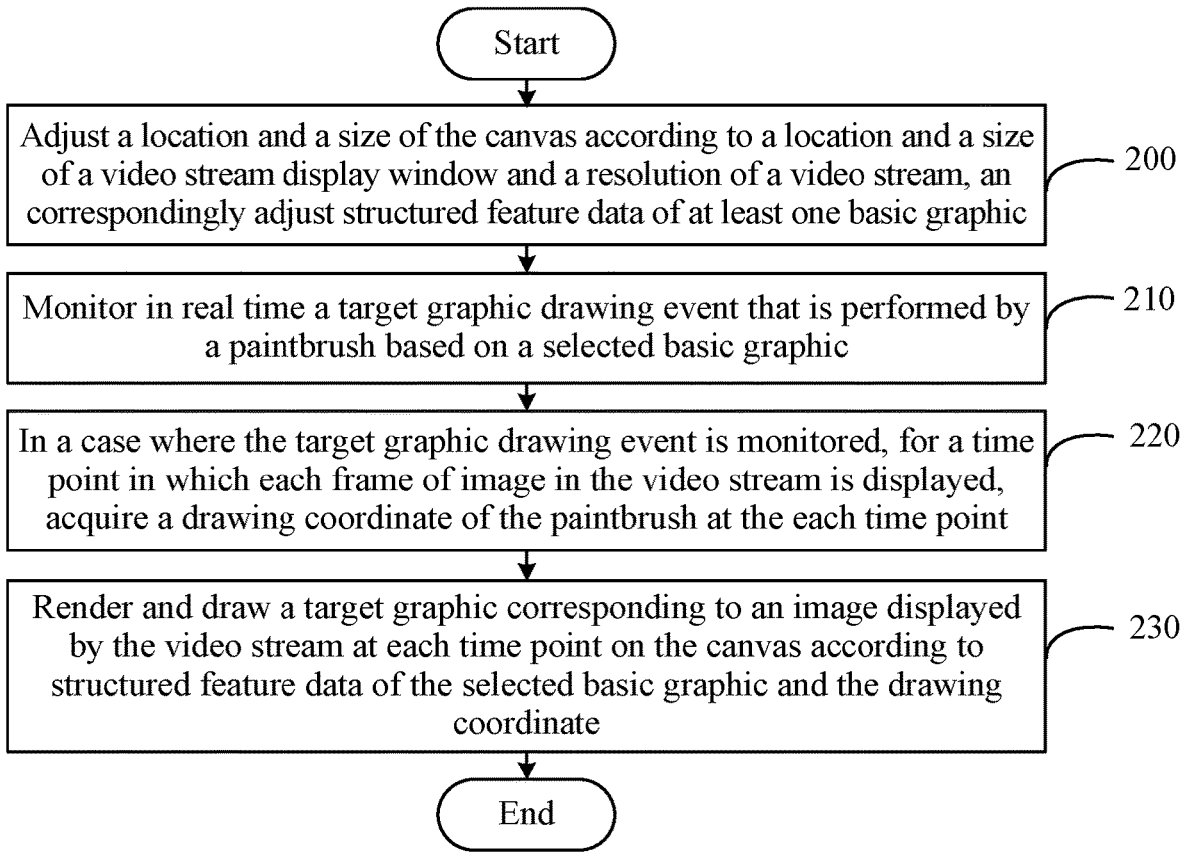
FIG. 6 is a schematic flowchart of the fifth graphic drawing method according to an embodiment of the present disclosure.

With reference to FIG. 6, FIG. 6 is a schematic flowchart of the fifth graphic drawing method according to an embodiment of the present disclosure. In this embodiment of the present disclosure, the graphic drawing method further includes step 200.

In step 200, a location and a size of the canvas are adjusted according to a location of the video stream display window, a size of the video stream display window and a resolution of the video stream, and the structured feature data of at least one basic graphic is correspondingly adjusted.

In this embodiment, the terminal device, before responding to the user to perform graphic drawing, detects location information and size information of the video stream display window on the browser page, and parses a video stream to be displayed to obtain a resolution of the video stream, so as to adjust the location and size of the canvas on the browser page based on the obtained location and size of the video stream display window and the resolution of the video stream, thereby ensuring that the canvas is deployed on the upper layer of the video stream display window and that the size of the canvas matches the size of the video stream display window.

The terminal device 10, after completing the adjustment of the canvas, adjusts the structured feature data of at least one basic graphic based on the current size information and location information of the canvas to ensure that the structured feature data of at least one basic graphic always matches the canvas.

Figure 7:
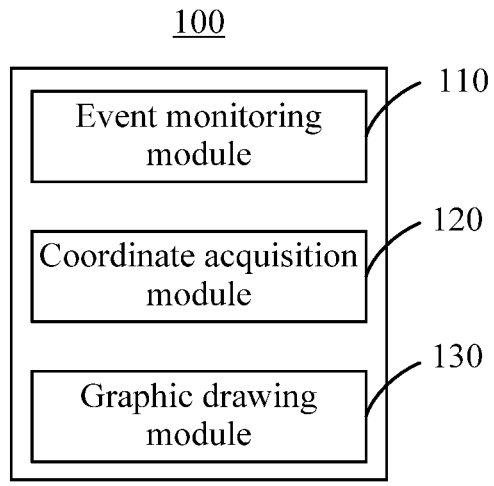
FIG. 7 is a schematic structural diagram of a graphic drawing apparatus according to an embodiment of the present disclosure.

With reference to FIG. 7, FIG. 7 is a schematic structural diagram of a graphic drawing apparatus 100 according to an embodiment of the present disclosure. In this embodiment of the present disclosure, the graphic drawing apparatus is applied to the terminal device 10 shown in FIG. 1.

The terminal device 10 displays each frame of image of a video stream through a video stream display window on a browser page. The terminal device 10 is deployed with a canvas on the upper layer of the video stream display window and stores structured feature data of at least one basic graphic matching the canvas. The graphic drawing apparatus 100 includes an event monitoring module 110, a coordinate acquisition module 120, and a graphic drawing module 130.

The event monitoring module 110 is configured to monitor in real time a target graphic drawing event that is performed by a paintbrush based on a selected basic graphic.

Figure 8:
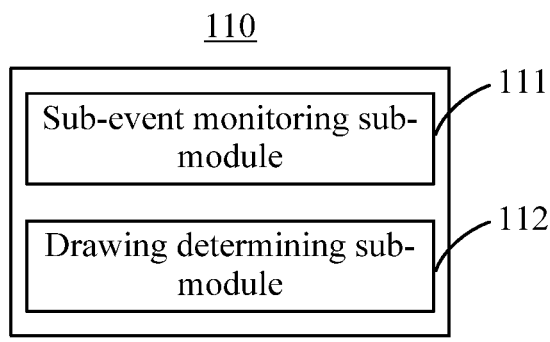
FIG. 8 is a schematic structural diagram of an event monitoring module according to an embodiment of the present disclosure.

In one embodiment, with reference to FIG. 8, FIG. 8 is a schematic structural diagram of the event monitoring module 110 in FIG. 7. In this embodiment, the target graphic drawing event includes a paintbrush press-down sub-event, a drawing moving sub-event, and a paintbrush raising sub-event, and the event monitoring module 110 includes a sub-event monitoring sub-module 111 and a drawing determining sub-module 112.

The sub-event monitoring sub-module 111 is configured to monitor in real time the generation of the paintbrush press-down sub-event, the drawing moving sub-event and the paintbrush raising sub-event separately.

The drawing determining sub-module 112 is configured to, in response to monitoring a result that any one of the paintbrush press-down sub-event, the drawing moving sub-event or the paintbrush raising sub-event is generated, determine that the target graphic drawing event is generated.

The coordinate acquisition module 120 is configured to, in a case where the target graphic drawing event is monitored, acquire, for a time point in which each frame of image in the video stream is displayed, a drawing coordinate of the paintbrush at each time point.

In this embodiment, the drawing coordinate includes a drawing starting coordinate and a drawing ending coordinate. The coordinate acquisition module 120 is configured to: obtain sub-event information corresponding to the paintbrush at the time point in which each frame of image in the video stream is displayed according to a monitoring result of the paintbrush press-down sub-event, the drawing moving sub-event and the paintbrush raising sub-event; in a case where the sub-event information corresponds to the paintbrush press-down sub-event, use a location coordinate of the paintbrush on the browser page at a time point of the paintbrush press-down event as a drawing starting coordinate of the target graphic; and in a case where the sub-event information corresponds to the drawing moving sub-event or the paintbrush raising sub-event, use a location coordinate of the paintbrush on the browser page at a time point of the drawing moving sub-event or the paintbrush raising sub-event as a drawing ending coordinate of the target graphic.

The graphic drawing module 130 is configured to render and draw on the canvas a target graphic corresponding to an image displayed by the video stream at each time point according to structured feature data of the selected basic graphic and the drawing coordinate.

Figure 9:
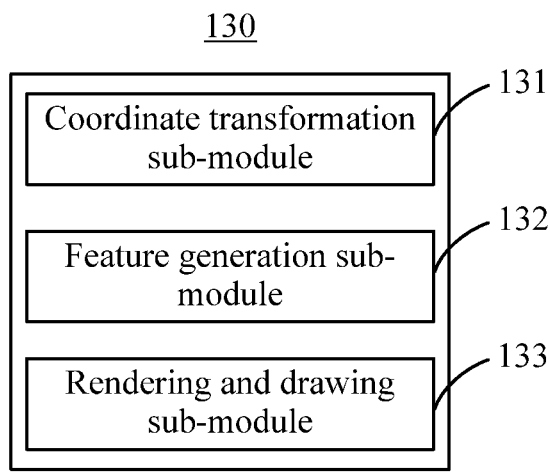
FIG. 9 is a schematic structural diagram of a graphic drawing module according to an embodiment of the present disclosure.

In one embodiment, with reference to FIG. 9, FIG. 9 is a schematic structural diagram of the graphic drawing module 130 in FIG. 7. In this embodiment, the graphic drawing module 130 includes a coordinate transformation sub-module 131, a feature generation sub-module 132, and a rendering and drawing sub-module 133.

The coordinate transformation sub-module 130 is configured to perform a coordinate transformation on the drawing starting coordinate and the drawing ending coordinate to obtain a rendering starting coordinate and a rendering ending coordinate of the target graphic on the canvas at each time point.

The feature generation sub-module 132 is configured to generate structured feature data of the target graphic at each time point according to the rendering starting coordinate, the rendering ending coordinate and the structured feature data of the selected basic graphic.

The rendering and drawing sub-module 133 is configured to render and draw on the canvas the corresponding target graphic based on the structured feature data of the target graphic.

Figure 10:
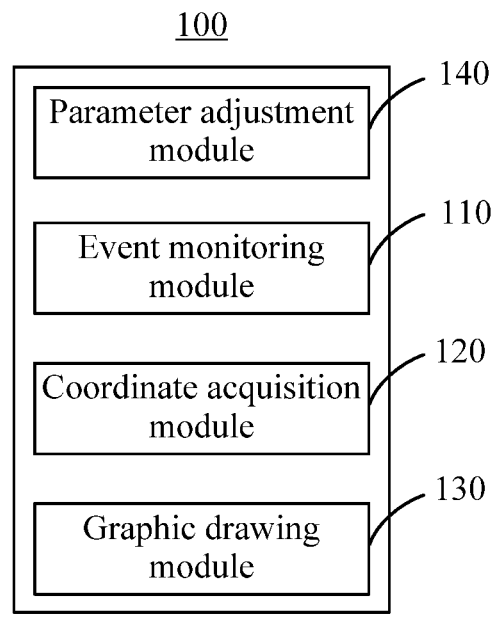
FIG. 10 is a schematic structural diagram of another graphic drawing apparatus according to an embodiment of the present disclosure.

With reference to FIG. 10, FIG. 10 is a schematic structural diagram of another graphic drawing apparatus 100 according to an embodiment of the present disclosure. In this embodiment of the present disclosure, the graphic drawing apparatus 100 may further include a parameter adjustment module 140.

The parameter adjustment module 140 is configured to adjust a location and a size of the canvas according to a location and a size of the video stream display window and a resolution of the video stream, and correspondingly adjust the structured feature data of at least one basic graphic such that the canvas is deployed on the upper layer of the video stream display window and the structured feature data of at least one basic graphic matches the canvas.

In summary, in the graphic drawing method and apparatus provided by the embodiments of the present disclosure, the graphic drawing method has a small amount of data processing and a high data processing efficiency and can perform graphic drawing on a video played and displayed by a browser, so as to implement the graphic drawing animation effect and ensure that the drawn graphics can be used for interactive processing. The method is applied to a terminal device that displays each frame of image of a video stream through a video stream display window on a browser page and includes a canvas deployed on the upper layer of the video stream display window and structured feature data of at least one basic graphic matching the canvas. First, the method monitors in real time whether a target graphic drawing event performed by a paintbrush based on a selected basic graphic is generated. Then, when the target graphic drawing event is monitored, the method, for a time point in which each frame of image in the video stream is displayed, acquires a drawing coordinate of the paintbrush at each time point. Finally, every time the drawing coordinate at each time point is acquired, the method renders and draws on the canvas a target graphic corresponding to an image displayed by the video stream at each time point according to the drawing coordinate and the structured feature data of the selected basic graphic. Therefore, the graphic drawing animation effect is implemented on the video stream while playing and displaying the video stream by drawing, for each frame of image, a corresponding target graphic on the canvas that is not on the same layer as the video stream display window, thereby ensuring that the drawn graphics can be used for interactive processing. Since the drawing of the target graphic is implemented based on the structured feature data of the basic graphic, the computing resources of the terminal device do not need to be consumed substantially to construct and draw the target graphic, thereby reducing the amount of data processing in the graphic drawing process and accordingly improving the data processing efficiency.

Figure 11:
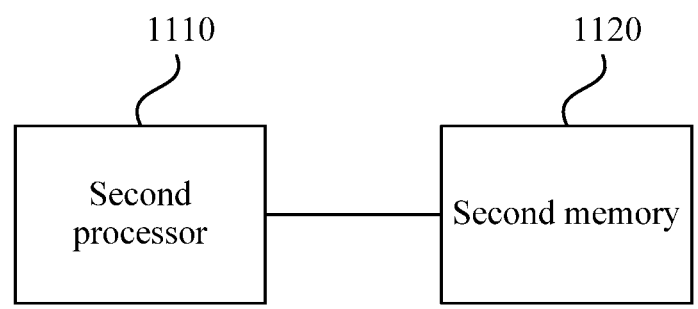
FIG. 11 is a schematic structural diagram of an electronic device according to an embodiment of the present disclosure.

In one embodiment, the present disclosure further provides a device. With reference to FIG. 11, the device includes a second processor 1110 and a second memory 1120, where the second memory 1120 is configured to store a computer program, and the second processor 1110 is configured to execute the computer program to perform the method of any embodiment described above.

In one embodiment, the present disclosure further provides a storage medium storing a computer-readable program. When the computer-readable program is executed, the method of any embodiment described above is performed.

The storage medium is any one or more of various types of memory devices or storage devices. The term "storage medium" is intended to include: an installation media, a read-only memory (ROM) such as a compact disc read-only memory (CD-ROM), a floppy disk or a magnetic tape device; a computer system memory or a random access memory such as a dynamic random access memory (DRAM), a double data rate random access memory (DDR RAM), a static random-access memory (SRAM), an extended data output random access memory (EDO RAM), a Rambus random access memory (Rambus RAM); a non-volatile memory such as a flash memory and a magnetic media (e.g., a hard disk or an optical storage); a register or other similar types of memory components, etc. The storage medium may further include other types of memories or combinations thereof.

What is claimed is:

1. A graphic drawing method, applied to a terminal device that displays each frame of image of a video stream through a video stream display window on a browser page and comprises a canvas deployed on an upper layer of the video stream display window and structured feature data of at least one basic graphic matching the canvas, comprising:
    monitoring in real time a target graphic drawing event that is performed by a paintbrush based on a selected basic graphic;
    in a case of monitoring the target graphic drawing event, acquiring, for a time point in which each frame of image in the video stream is displayed, a drawing coordinate of the paintbrush at the each time point; and
    rendering and drawing on the canvas a target graphic corresponding to an image displayed by the video stream at the each time point according to structured feature data of the selected basic graphic and the drawing coordinate;
    wherein the structured feature data is used for indicating key features of the at least one basic graphic, the key features comprises attribution features and behavioral features, the attribution features comprises an upper-left corner coordinate, a lower-right corner coordinate, a thickness and a color of a line, whether a center of a rectangle is filled, a fill color, and transparency, and the behavioral features comprises whether the basic graphic is selected on the corresponding canvas, and whether the basic graphic is displayed.

2. The method of claim 1, wherein the target graphic drawing event comprises a paintbrush press-down sub-event, a drawing moving sub-event, and a paintbrush raising sub-event.

3. The method of claim 2, wherein monitoring in real time the target graphic drawing event that is performed by the paintbrush based on the selected basic graphic comprises:
    monitoring in real time generation of the paintbrush press-down sub-event, the drawing moving sub-event and the paintbrush raising sub-event separately; and
    in response to monitoring a result that any one of the paintbrush press-down sub-event, the drawing moving sub-event or the paintbrush raising sub-event is generated, determining that the target graphic drawing event is generated.

4. The method of claim 3, wherein the drawing coordinate comprises a drawing starting coordinate and a drawing ending coordinate.

5. The method of claim 4, wherein acquiring, for the time point in which the each frame of image in the video stream is displayed, the drawing coordinate of the paintbrush at the each time point comprises:
obtaining sub-event information corresponding to the paintbrush at the time point in which the each frame of image in the video stream is displayed according to a monitoring result of the paintbrush press-down sub-event, the drawing moving sub-event and the paintbrush raising sub-event;
in a case where the sub-event information corresponds to the paintbrush press-down sub-event, using a location coordinate of the paintbrush on the browser page at a time point of the paintbrush press-down event as a drawing starting coordinate of the target graphic; and
in a case where the sub-event information corresponds to the drawing moving sub-event or the paintbrush raising sub-event, using a location coordinate of the paintbrush on the browser page at a time point of the drawing moving sub-event or the paintbrush raising sub-event as a drawing ending coordinate of the target graphic.

6. The method of claim 1, wherein rendering and drawing on the canvas the target graphic corresponding to the image displayed by the video stream at the each time point according to the structured feature data of the selected basic graphic and the drawing coordinate comprises:
performing a coordinate transformation on the drawing starting coordinate and the drawing ending coordinate to obtain a rendering starting coordinate and a rendering ending coordinate of the target graphic on the canvas at the each time point;
generating structured feature data of the target graphic at the each time point according to the rendering starting coordinate, the rendering ending coordinate and the structured feature data of the selected basic graphic; and
rendering and drawing on the canvas the corresponding target graphic based on the structured feature data of the target graphic.

7. The method of claim 1, further comprising:
adjusting a location and a size of the canvas according to a location of the video stream display window, a size of the video stream display window and a resolution of the video stream, and correspondingly adjusting the structured feature data of at least one basic graphic such that the canvas is deployed on an upper layer of the video stream display window and the structured feature data of at least one basic graphic matches the canvas.

8. A device, comprising a processor and a memory, wherein the memory stores a computer program which, when executed by the computer program, implements the method of claim 1.

9. A storage medium storing a computer-readable program, wherein when the program is executed, the method of claim 1 is implemented.

10. A graphic drawing apparatus, applied to a terminal device that displays each frame of image of a video stream through a video stream display window on a browser page and comprises a canvas deployed on an upper layer of the video stream display window and structured feature data of at least one basic graphic matching the canvas, comprising:
a processor and a memory storing processor-executable instructions which, when executed by the processor, are configured to:
monitor in real time a target graphic drawing event that is performed by a paintbrush based on a selected basic graphic;
in a case of monitoring the target graphic drawing event, acquire, for a time point in which each frame of image in the video stream is displayed, a drawing coordinate of the paintbrush at the each time point; and
render and draw on the canvas a target graphic corresponding to an image displayed by the video stream at the each time point according to structured feature data of the selected basic graphic and the drawing coordinate;
wherein the structured feature data is used for indicating key features of the at least one basic graphic, the key features comprises attribution features and behavioral features, the attribution features comprises an upper-left corner coordinate, a lower-right corner coordinate, a thickness and a color of a line, whether a center of a rectangle is filled, a fill color, and transparency, and the behavioral features comprises whether the basic graphic is selected on the corresponding canvas, and whether the basic graphic is displayed.

11. The apparatus of claim 10, wherein the target graphic drawing event comprises a paintbrush press-down sub-event, a drawing moving sub-event, and a paintbrush raising sub-event.

12. The apparatus of claim 11, wherein the processor is further configured to:
monitor in real time generation of the paintbrush press-down sub-event, the drawing moving sub-event and the paintbrush raising sub-event separately; and
in response to monitoring a result that any one of the paintbrush press-down sub-event, the drawing moving sub-event or the paintbrush raising sub-event is generated, determine that the target graphic drawing event is generated.

13. The apparatus of claim 12, wherein the drawing coordinate comprises a drawing starting coordinate and a drawing ending coordinate.

14. The apparatus of claim 13, wherein the processor is further configured to:
obtain sub-event information corresponding to the paintbrush at the time point in which the each frame of image in the video stream is displayed according to a monitoring result of the paintbrush press-down sub-event, the drawing moving sub-event and the paintbrush raising sub-event;
in a case where the sub-event information corresponds to the paintbrush press-down sub-event, use a location coordinate of the paintbrush on the browser page at a time point of the paintbrush press-down event as a drawing starting coordinate of the target graphic; and
in a case where the sub-event information corresponds to the drawing moving sub-event or the paintbrush raising sub-event, use a location coordinate of the paintbrush on the browser page at a time point of the drawing moving sub-event or the paintbrush raising sub-event as a drawing ending coordinate of the target graphic.

15. The apparatus of claim 14, wherein the processor is further configured to:
perform a coordinate transformation on the drawing starting coordinate and the drawing ending coordinate to obtain a rendering starting coordinate and a rendering ending coordinate of the target graphic on the canvas at the each time point;
generate structured feature data of the target graphic at the each time point according to the rendering starting coordinate, the rendering ending coordinate and the structured feature data of the selected basic graphic; and render and draw on the canvas the corresponding target graphic based on the structured feature data of the target graphic.

16. The apparatus of claim 10, wherein the processor is further configured to:

adjust a location and a size of the canvas according to a location of the video stream display window, a size of the video stream display window and a resolution of the video stream, and correspondingly adjust the structured feature data of at least one basic graphic such that the canvas is deployed on an upper layer of the video stream display window and the structured feature data of at least one basic graphic matches the canvas.

* * * * *